US009723149B2

United States Patent
Meng et al.

(10) Patent No.: US 9,723,149 B2
(45) Date of Patent: Aug. 1, 2017

(54) ASSISTANT REDIRECTION FOR CUSTOMER SERVICE AGENT PROCESSING

(71) Applicant: Samsung Electronics Co., Ltd., Suwon-si, Gyeonggi-do (KR)

(72) Inventors: Yunsong Meng, Fremont, CA (US); Doreen Cheng, San Jose, CA (US); Yongmei Shi, San Jose, CA (US); Justin Martineau, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/832,862

(22) Filed: Aug. 21, 2015

(65) Prior Publication Data
US 2017/0054848 A1  Feb. 23, 2017

(51) Int. Cl.
*H04M 3/00* (2006.01)
*H04M 5/00* (2006.01)
*H04M 3/51* (2006.01)
*G06Q 30/02* (2012.01)
*H04M 3/523* (2006.01)

(52) U.S. Cl.
CPC .......... *H04M 3/5191* (2013.01); *G06Q 30/02* (2013.01); *H04M 3/5233* (2013.01)

(58) Field of Classification Search
CPC .......................... H04M 3/5191; H04M 3/5233
USPC ............................... 379/265.09, 265.01, 309
See application file for complete search history.

(56) References Cited

U.S. PATENT DOCUMENTS

| | | | |
|---|---|---|---|
| 6,959,080 B2 * | 10/2005 | Dezonno | H04M 3/523 379/265.07 |
| 7,242,751 B2 | 7/2007 | Bushey et al. | |
| 7,720,203 B2 | 5/2010 | Bushey et al. | |
| 8,583,416 B2 | 11/2013 | Huang et al. | |
| 8,831,208 B2 | 9/2014 | Suendermann et al. | |
| 2001/0024497 A1 | 9/2001 | Campbell et al. | |
| 2005/0135595 A1 | 6/2005 | Bushey et al. | |
| 2009/0110182 A1 * | 4/2009 | Knight, Jr. | H04M 3/5233 379/265.12 |
| 2009/0171662 A1 | 7/2009 | Huang et al. | |

(Continued)

OTHER PUBLICATIONS

Extended European Search Report dated May 9, 2015 for European Application No. 16157071.8 from European Patent Office, pp. 1-8, Munich, Germany.

(Continued)

*Primary Examiner* — Quynh Nguyen
(74) *Attorney, Agent, or Firm* — Sherman IP LLP; Kenneth L. Sherman; Hemavathy Perumal

(57) ABSTRACT

A method and device for automatic digital customer service agent processing to automatically redirect to a correct channel for assistance. A method includes obtaining communication information based on customer communication iterations. Customer emotion information and customer situation context information is detected based on customer information obtained from one or more devices. Redirection option information is retrieved for a condition corresponding to the customer situation context information from an assistant-redirection knowledge base. The customer situation context information, the communication information, the customer emotion information and the redirection option information are used to determine and to provide a redirection suggestion with a justification, or an answer response.

29 Claims, 9 Drawing Sheets

(56) References Cited

U.S. PATENT DOCUMENTS

| | | |
|---|---|---|
| 2012/0069131 A1 | 3/2012 | Abelow |
| 2012/0246081 A1 | 9/2012 | Brown et al. |
| 2013/0006874 A1 | 1/2013 | Klemm |
| 2013/0013546 A1 | 1/2013 | Bagchi et al. |
| 2013/0018685 A1 | 1/2013 | Parnaby et al. |
| 2013/0262349 A1 | 10/2013 | Bouqata et al. |
| 2014/0101079 A1 | 4/2014 | Deal |
| 2014/0270108 A1 | 9/2014 | Riahi et al. |
| 2014/0270109 A1 | 9/2014 | Riahi et al. |
| 2014/0270146 A1 | 9/2014 | Riahi et al. |
| 2014/0314225 A1 | 10/2014 | Riahi et al. |
| 2014/0365336 A1* | 12/2014 | Hurewitz ........... G06Q 30/0643 705/26.62 |

OTHER PUBLICATIONS

European Office Action dated Feb. 2, 2017 for European Application No. 16157071.8 from European Patent Office, pp. 1-6, Munich, Germany.

\* cited by examiner

ASSISTANT REDIRECTION FOR CUSTOMER SERVICE AGENT PROCESSING

TECHNICAL FIELD

One or more embodiments generally relate to semantic customer service processing, in particular, to automatic digital customer service agent processing to automatically redirect to a correct channel for assistance.

BACKGROUND

A good customer service is essential for business providers to maintain good relationship with customers and eventually determine the providers' market share. Even though business providers invest a lot of money on improving customer service each year, half of customer service calls typically go unresolved or require escalation. Yet, about 61% of the time, the failed calls (which inevitably erode customer satisfaction) could have been resolved with better access to information. In 2012, Mckinsey research noted that digital customer care responds to consumer demand for easily accessible, highly rewarding multichannel interactions. The Mckinsey report also showed that pure digital customer services enjoys 76% satisfaction rate, which is much higher than one of the traditional channel (57%) and the mix of traditional and digital channels (62%). According to Journal of Marketing, single point change in customer satisfaction corresponds to a 4.6% change in market value. It is highly desirable from customers to interface with digital assistant than to waste time waiting for the next available human agent.

SUMMARY

One or more embodiments generally relate to automatic digital customer service agent processing to automatically redirect to a correct channel for assistance. In one embodiment, a method includes obtaining communication information based on customer communication iterations. Customer emotion information and customer situation context information is detected based on customer information obtained from one or more devices. Redirection option information is retrieved for a condition corresponding to the customer situation context information from an assistant-redirection knowledge base. The customer situation context information, the communication information, the customer emotion information and the redirection option information are used to determine and to provide a redirection suggestion with a justification, or an answer response.

In one embodiment, an apparatus includes an electronic device configured to obtain communication information based on customer communication iterations. An emotion detector processor is configured to detect customer emotion information based on customer information. A situation detector processor is configured to detect customer situation context information based on the customer information.

In one embodiment a non-transitory processor-readable medium that includes a program that when executed by a processor performs a method that includes obtaining communication information based on customer communication iterations. Customer emotion information and customer situation context information is detected based on customer information obtained from one or more devices. Redirection option information is retrieved for a condition corresponding to the customer situation context information from an assistant-redirection knowledge base. The customer situation context information, the communication information, the customer emotion information and the redirection option information are used to determine and to provide a redirection suggestion with a justification, or an answer response.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
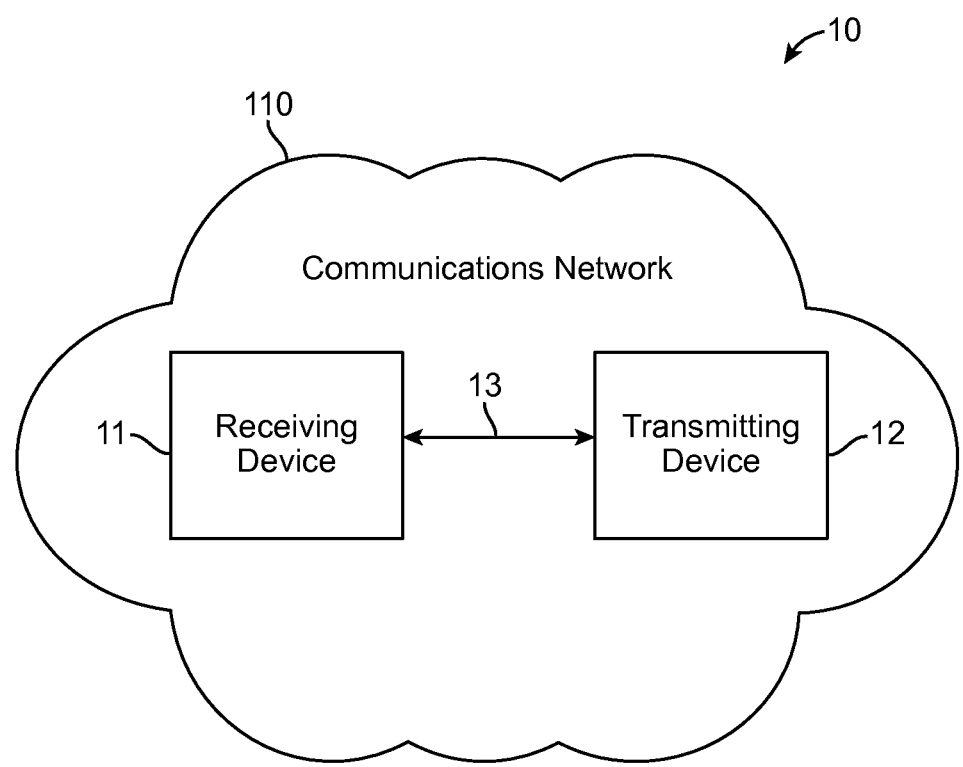
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments relate to automatic digital customer service agent processing to automatically redirect to a correct channel for assistance. In one embodiment, a method includes obtaining communication information based on customer communication iterations. Customer emotion information and customer situation context information is detected based on customer information obtained from one or more devices. Redirection option information is retrieved for a condition corresponding to the customer situation context information from an assistant-redirection knowledge base. The customer situation context information, the communication information, the customer emotion information and the redirection option information are used to determine and provide a redirection suggestion with a justification, or an answer response.

One or more embodiments detect user emotion based on user modality and dialog, and generate an explanation for digital customer service agent redirection. Additionally, one or more embodiments update a redirection knowledge base.

In one or more embodiments, content about a user that may be obtained, extracted, etc. may include text, voice, image, or video generated by the user, and may also include text, voice, image, and video about the user generated from the sensors in the environment. One or more embodiments: detect customer emotion based on the content either generated by the customer, generated about the customer, or generated by and about the customer. User situation information is detected based on the content either generated by the customer, generated about the customer, or generated by and about the customer. Assistant redirection is suggested based on one or more of the following information: user situation, dialog information and customer's current emotion state. Justifications for the redirection are generated and an assistant-redirection knowledge base (KB) is updated with new relevant information.

One or more embodiments perform processing using one or more processors that are configured to redirect a customer, by interacting with an electronic device (e.g., electronic device 120 (see FIG. 2), to a human or another digital agent that may best assist the customer, based on the customer's machine detected and determined: situation and emotional state, the communication status between the customer and the digital agent, or a combination thereof. One or more embodiments generate additional machine determined information to help the customer to understand the reasons for each suggested redirection. Additionally, one or more embodiments improve assistant redirection knowledge by machine learning from new relevant information, such as new guidelines, specifications, new dialogs of customer service live chat, etc.

FIG. 1 is a schematic view of a communication system 10, in accordance with one embodiment. Communications system 10 may include a communications device (transmitting device 12) that initiates an outgoing communications operation and a communications network 110, which transmitting device 12 may use to initiate and conduct communications operations with other communications devices within communications network 110. For example, communications system 10 may include a communications device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a BLACKBERRY®). Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
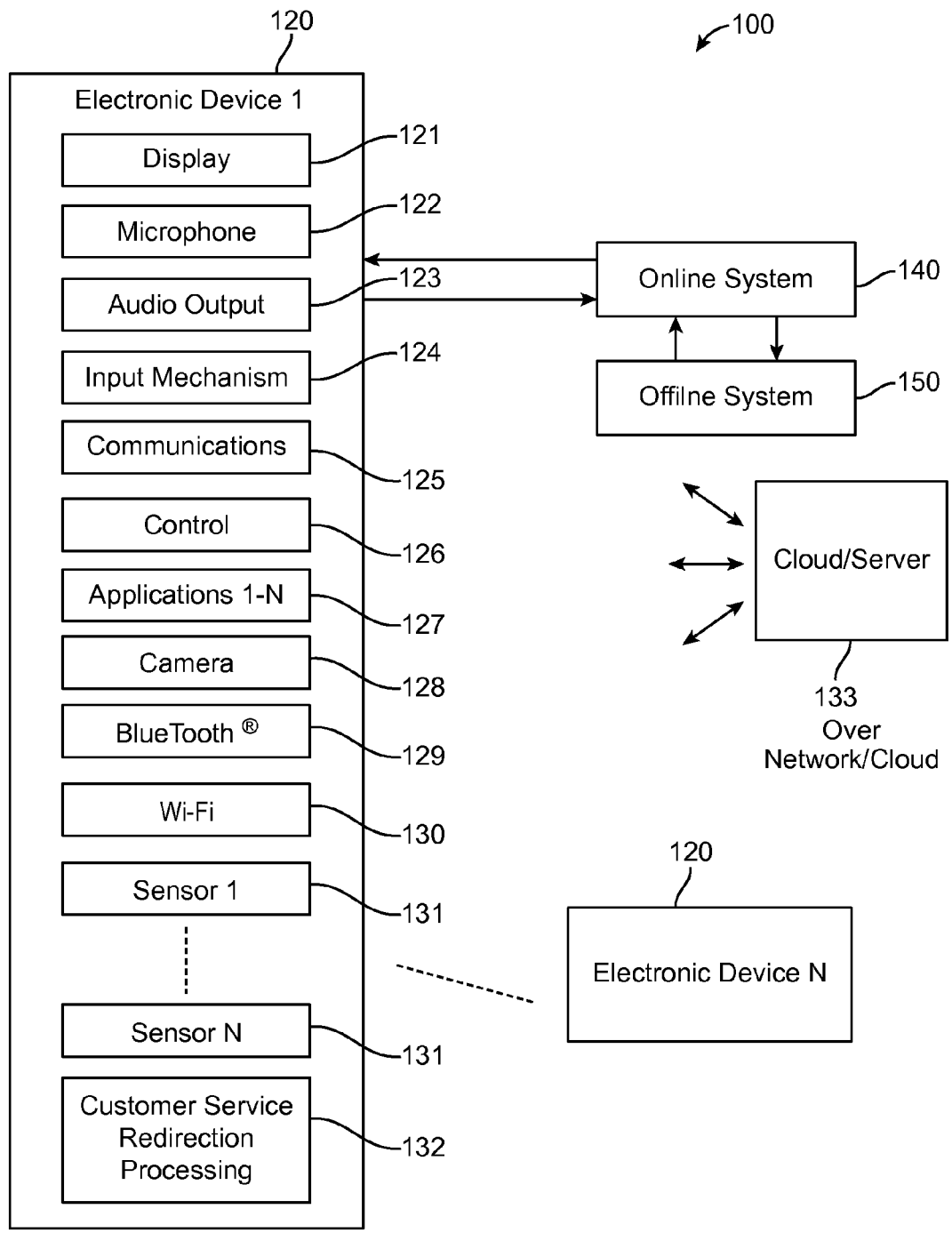
FIG. 2 shows a block diagram of architecture for a system including a server, one or more electronic devices, and customer service redirection online and offline systems, according to an embodiment.

FIG. 2 shows a functional block diagram of an architecture system 100 that may be used for providing digital customer service agent processing to automatically redirect to a correct channel for assistance using one or more electronic devices 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, Applications 1-N 127, a camera 128, a BLUETOOTH® interface 129, a Wi-Fi interface 130 and sensors 1 to N 131 (N being a positive integer), customer service redirection processing 132 (e.g., a processor, an interface, a process that operates with a processor, etc.), a cloud based or server 133 (e.g., that communicates over a network (e.g., a local area network (LAN), a wide based area network (WAN), the Internet, a personal area network (PAN), a private network, etc., or cloud), an online customer service redirection processing system 140, an offline customer service redirection processing system 150, and any other suitable components. In one embodiment, applications 1-N 127 are provided and may be obtained from a cloud or server 133, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In one embodiment, the display 121 may include any suitable screen or projection system for providing a display visible to the user. For example, display 121 may include a screen (e.g., an LCD or LED screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), BLUETOOTH®, high frequency systems (e.g., 900 MHz, 2.4 GHz, and 5.6 GHz communication systems), infrared, GSM, GSM plus EDGE, CDMA, quad-band, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., FACEBOOK®, TWITTER®, INSTAGRAM®, etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera 128 comprises one or more camera devices that include functionality for capturing still and video images, editing functionality, communication interoperability for sending, sharing, etc., photos/videos, etc.

In one embodiment, the BLUETOOTH® interface 129 comprises processes and/or programs for processing BLUETOOTH® information, and may include a receiver, transmitter, transceiver, etc.

In one embodiment, the electronics device 120 may include multiple sensors 1 to N 131, such as accelerometer, gyroscope, microphone, temperature, light, barometer, magnetometer, compass, radio frequency (RF) identification sensor, global positioning system (GPS), touch, visual, etc. In one embodiment, the multiple sensors 1-N 131 provide information for or about a user for customer service redirection processing 132. In one embodiment, the multiple sensors 1-N 131 may be aggregated or used from different electronic devices, such as an electronic device 120 (e.g., a smartphone, tablet, mobile computing device, etc.) and another electronic device N 120 (e.g., a wearable device). For example, a gyroscope sensor and/or a temperature sensor may be used from a wearable device, and a microphone sensor may be used from a smartphone.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
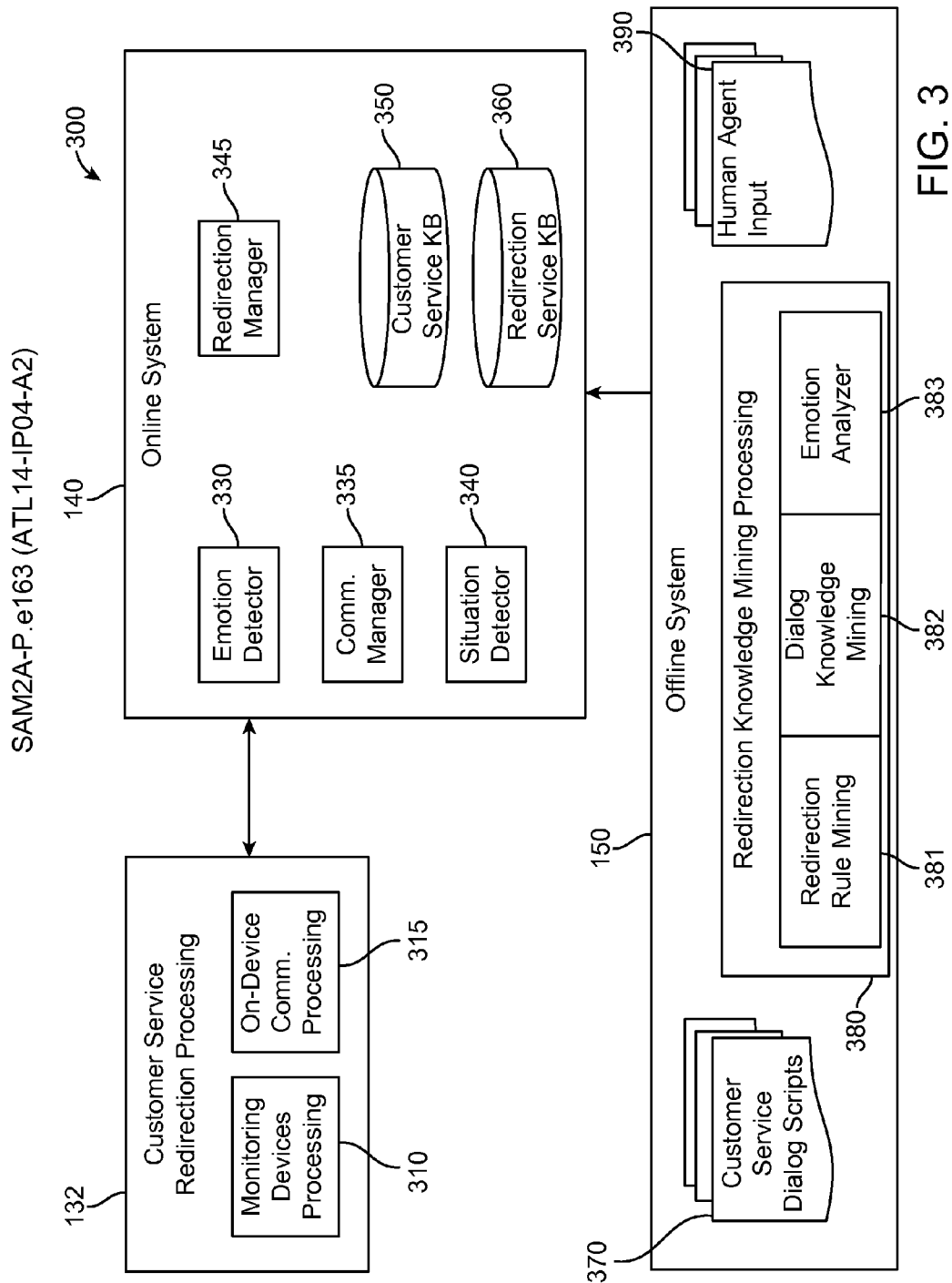
FIG. 3 shows a system for digital customer service redirection, according to an embodiment.

FIG. 3 shows a system 300 for digital customer service redirection, according to an embodiment. In one embodiment, the system 300 includes the customer service redirection processing 132 (e.g., operating an electronic device 120), the online customer service redirection processing system 140, and the offline customer service redirection processing system 150. In one embodiment, the customer service redirection processing 132 includes monitoring devices processing 310 (e.g., sensors 1-N 131, text analyzer processor(s), video analyzer processor(s), voice analyzer processor(s), other content analyzer processor(s), etc.) and on-device communication processing 315.

In one embodiment, the online customer service redirection processing system 140 includes an emotion detector 330 (e.g., a processor operating with emotion detection functionality for analyzing emotion from communication content), a communication manager 335, a situation detector 340 (e.g., a processor operating with situation detection functionality for analyzing a customer situation from communication content), a redirection manager 345, a customer service KB 350 and a redirection (or service assistant-redirection) KB 360.

In one embodiment, the offline customer service redirection processing system 150 includes customer service dialog scripts 370, redirection knowledge mining processing 380, and human agent input 390 (direct encoding of redirection server knowledge or customer service knowledge; dialog scripts). In one embodiment, the redirection knowledge mining processing 380 includes redirection rule mining 381, dialog knowledge mining 382 and an emotion analyzer 383.

Ideally, a digital customer service agent should possess the knowledge to assist a customer with any issue. Often, situations arise when the customer's issues are too complex or too crucial to be solved by a digital agent, or the issue is beyond the capability or responsibility of the specific service provider. In these situations, the digital agent should redirect the assistant to a different customer service channel, such as human agents, service centers, local stores or third-party supports.

Conventional virtual assistant redirection methods are hardcoded by rules and do not take into account the communication details between the customer and the agent. For example, with a conventional virtual telephone customer service agent, if the virtual agent fails to understand the customer a number of times, then the call is redirected to a human agent. These methods do not understand the customers and add unnecessary burdens to both the customers and human agents.

It should be noted that redirection includes: when the customer's issues are too complex or too crucial for a virtual agent to solve, or when the issue is beyond the capability or responsibility of the specific service provider, the digital agent redirects the customer to one or more customer service channels that are more appropriate for solving the issues. Human agents, other service centers, local stores or third-party supports are examples of possible redirection channels.

In one embodiment, the system 300 provides assistant redirection from a digital customer service agent to a human agent or another virtual channel that may solve a customer's problem. In one embodiment, the online system 140 uses the dialog manager 335 to obtain dialog information (e.g., content, workflow state information, etc.) based on dialog iterations (back and forth dialog between a customer and a digital agent resulting from questions asked and responses) between the digital agent and the customer that is using an electronic device 120 (FIG. 2) including the customer service redirection processing 132. The emotion detector 330 detects customer emotion information and the situation detector 340 detects user situation information based on the content (e.g., text, image, video, voice, etc.) either generated by the customer, generated about the customer, or both generated by the customer and about the customer (e.g., using the monitoring devices processing 310). In one embodiment, the emotion detector 330 analyzes content using a variety of techniques. In one example, the acoustic tone of voice interactions may be analyzed to understand emotions using deep learning. Classic hand crafted features such as finishing a sentence on a rising or lowered tone may also be included in the emotion classifier. Automatic speech-to-text technology may be used to produce a textual form of the conversation. In one example, the dialog may have originally been written. In one example, supervised "bag of words" models may be used to identify emotion during the conversation. Deep learning may be used to process video signals to identify emotions in faces and other body language. In one embodiment, the video signals may be tracked through time during the dialog to identify when the trouble shooting is or is not working well. User situation includes the type of device on which the user is communicating with the digital assistant, and context (e.g., if the user is driving, walking, standing or sitting, location, etc.). In one embodiment, sensor data may be used to determine context (e.g., accelerometer data, GPS data, etc.).

In one embodiment, the redirection manager 345 retrieves the knowledge from the redirection service KB 360 that includes the knowledge about redirection options under the detected situation. In one embodiment, the redirection manager 345 combines customer situation information, dialog information, customer emotion information and retrieved redirection knowledge to determine if a redirection should be initiated. If redirection is needed, the redirection manager 345 determines which redirection or redirections should be suggested and generates justifications (e.g., explained and understandable reasons) for the redirection. If redirection is needed, the online system 140 returns the redirection suggestions and corresponding justifications to the electronic device 120 including the customer service redirection processing 132 for the customer. If redirection is not needed, the online system 140 returns an answer response to the electronic device 120 including the customer service redirection processing 132 for the customer. In one embodiment, the offline system 150 analyzes a new customer service live textual chat log or a recorded audio dialog to extract at least one of: (a) assistant redirection options, (b) assistant redirection rules, (c) justification, or a combination thereof; and updates the redirection service KB 360 with extracted knowledge.

In one embodiment, the system 300 provides the following: redirects a customer based on user dialog, without the customer asking for it; redirects a customer by detecting user situation, without the customer asking for it; redirects a customer by detecting customer emotion based on the content generated by the customer or about the customer, without the customer asking for it; generates justification of detection and/or redirection. In one example, a customer expresses negative emotion, such as anger, frustration, etc., in text, facial expression, posture/gesture, etc. In one example, voice, tune, pitch of speech are indicators of emotion. Indicators from text may include word(s), phrase(s) used, etc. An image or a sequence of images from a customer may be analyzed to detect emotion. For example, detecting an angry face from an image. In one example, sensor data assists in detecting customer emotion, such as a heart rate monitor. The customer observes one or more of the following responses from the online system 300: suggests a redirection or explains the redirection is based on user emotion. An example of the online system 300 response is as follows: "I hear you and I am sorry that you are frustrated. I will connect you with a human agent." In one example, the customer uses the system 300 under a different situation where a troubleshooting inspection is not possible, such as driving, running, etc. In one example, the customer also observes one or more of the following responses from the system: suggests a redirection, explains the redirection is based on user situation. An example of a system 300 response may be: "Further assisting you might require testing your device. However, I detect that you are driving. Do you prefer contacting me back later? Or do you want me to file a service request to send a technician to you later?" The customer uses the system 300 and creates a testing dialog flow, e.g., having talked about many options but still no solution. The customer may observe one or more of the following responses from the system suggests a redirection, or explains the redirection is based on dialog. An example of system 300 response may include: "We've tried many attempts but still no solution, I will connect you to a human agent, who might better assist you."

In one embodiment, the offline system 150 provides information for the online system 140. In one example, customer service dialog scripts are created based on all known and learned problems, scenarios, issues, types of situations, types of emotions, responses, etc. In one embodiment, the redirection knowledge mining 380 mines (e.g., obtains, extracts, determines, etc.) redirections rules (redirection rule mining 381). The dialog knowledge mining 382 mines dialog knowledge based on previous dialog information, positive responses, negative responses, etc. The emotion analyzer 383 analyzes emotion based on collected monitored sensed data (e.g., from monitoring devices processing 310), comparison of text, facial expression information, tone of voice, words uttered, text used in dialogs, etc. In one embodiment, human agent input 390 includes previous recorded human agent dialog information, answers to questions receiving a positive result, direct input of redirection rules, entries in the KB 360, etc.

Figure 4:
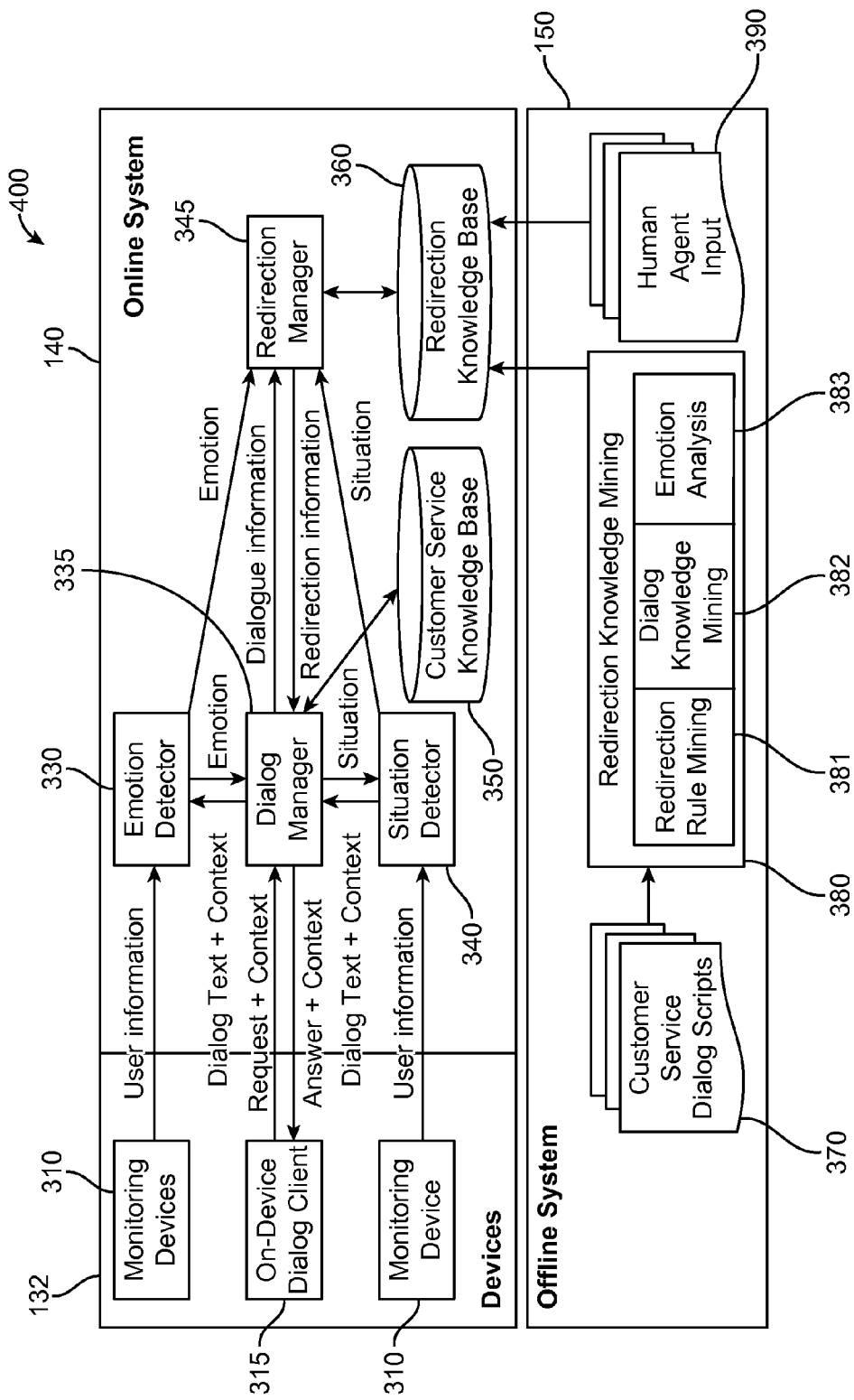
FIG. 4 shows information flow for digital customer service redirection, according to an embodiment.

FIG. 4 shows information flow 400 for digital customer service redirection, according to an embodiment. In one embodiment, the information flow 400 shows the information flow for system 300 (FIG. 3). In one example, the information flow 400 shows information flow by and between devices (e.g., electronic devices 120), the online system 140 and the offline system 150. In one embodiment, a role of a device (e.g., electronic device 120) is to interact with a customer. The online system 140 has the knowledge and capabilities for supporting customer service interactions with users of electronic devices 120. The offline system 150 supports the capabilities of obtaining new knowledge for updating the redirection KB 360.

In one embodiment, user information for the user flows from the monitoring devices 310 to the emotion detector 330 and the situation detector 340. In one example, a customer request and context flows from the on-device dialog processing 315 to the dialog manager 335, and a response or answer and context flows back from the dialog manager 335 to the on-device dialog processing 315.

In one embodiment, the emotion detector 330 provides detected emotion information to the dialog manager 335 and receives dialog text and context back from the dialog manager 335. In one embodiment, the situation detector 340 provides detected situation information to the dialog manager 335 and receives dialog text and context back from the dialog manager 335. In one embodiment, the dialog manager 335 provides dialog information to the redirection manager 345. The emotion detector 330 provides emotion information to the redirection manager 345. The situation detector 330 provides situation information to the redirection manager 345. In one embodiment, the redirection manager 345 provides a redirection decision back to the dialog manager 335.

In one embodiment, the dialog manager sends and receives information to/from the customer service KB 350. The redirection manager 345 sends and receives redirection knowledge to/from the redirection KB 360.

In one embodiment, the offline system 150 performs dialog knowledge mining 382 as follows. In one embodiment, dialog act modeling processing is performed including to model and classify utterances in a dialog, to a set of tags, which indicate the functionality and intention of the utterance. An example of such processing may be implemented by training a classifier using supervised or unsupervised processing. Such tagging prepares for the knowledge extraction from the dialog as follows. In one example, factual knowledge extraction is guided by tags generated in dialog act modeling that includes the domain model of a specific task and the extracted concepts from customer service documents, and factual knowledge extraction identifies the customer service concepts mentioned in the dialog. In one embodiment, this processing may be implemented using a rule-based method or by training a classifier using supervised or semi-supervised machine learning. Such concept labelling prepares the required knowledge for workflow mining.

In one embodiment, dialog workflow mining involves the following, based on the above labelled customer service concepts, workflow mining uses unsupervised or semi-supervised machine learning to partition and classify dialog, map identified dialog to existing models to identify transition of states in a given dialog.

In one embodiment, emotion analysis 383 provides the following processing. In one example, the emotion of the customer is analyzed in the live chat text based on words used, combination of words used, slang used, etc. In one embodiment, redirection rule mining 381 includes identity redirection options based on using rule learning to determine redirection rules from the livechat content based on the dialog workflow, dialog state, and customer emotion in the current state. In one embodiment, redirection rules are trained from the chatlog data, which includes the condition of the redirection (e.g., dialog state, dialog path, dialog content, customer emotion, modality, etc.) and which redirection option to take under the condition. Examples of rule learning techniques include inductive logic programming, probabilistic approaches (e.g., Markov logic network (MLN)) and associated rule learning methods.

Figure 5:
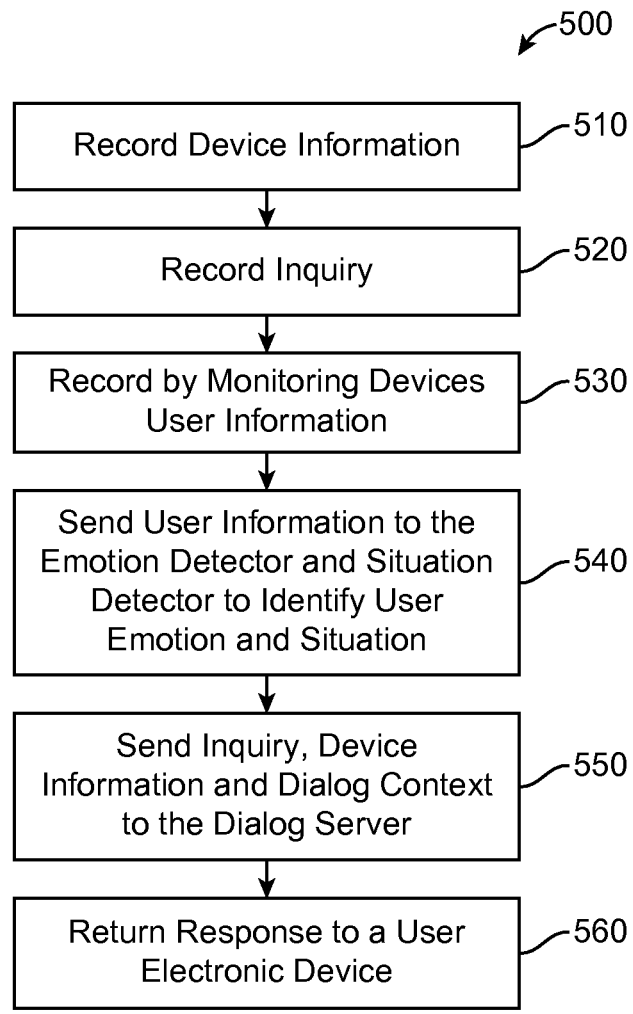
FIG. 5 shows an example process for an electronic device processing for digital customer service redirection, according to an embodiment.

FIG. 5 shows an example process 500 for an electronic device (e.g., electronic device 120, FIG. 2, on-client device, etc.) processing for digital customer service redirection (e.g., using customer service redirection processing 132), according to an embodiment. In one embodiment, in block 510 device information is recorded. In one example, when a conversation is initiated, the on-device processing records device information (e.g., device(s) type, model(s), etc.). In one embodiment, in block 520 an inquiry is recorded. In block 530 the user/customer dialog information and user context information (or sensor data) are recorded by monitoring devices processing 310. In one embodiment, in block 540 the user information, is sent to the emotion detector 330 and situation detector 340 to identify user emotion and situation. In one example, a user/customer inquiry is recorded and sent to the dialog server (e.g., online system 140). In block 550 the inquiry, the device information and the dialog context are sent to the dialog server. Dialog context is the knowledge about current dialog state of the user-agent communication. An initial state is sent if the conversation is just initiated. In block 560, a response and dialog context are received from the dialog server and the response is returned to the customer/user using the device.

In one embodiment, the monitoring devices 310 may be any device that monitors user information. Examples of the monitoring devices include smartphones, cameras, smart watches, smart glasses, wearable sensors, sensors 1-N 131, etc. Examples of user information include video, images, voice, sensor readings, etc. In another example, user information includes call logs, BLUETOOTH® devices in proximity, cell tower IDs, application usage, phone status (such as charging and idle), picture or video of the user, etc. Note that the two monitoring devices 310 may refer to the same set of devices. In one embodiment, monitoring devices 310 record information about the user and send the information to emotion detector 330 and the situation detector 340 to identify user emotion and situation.

Figure 6:
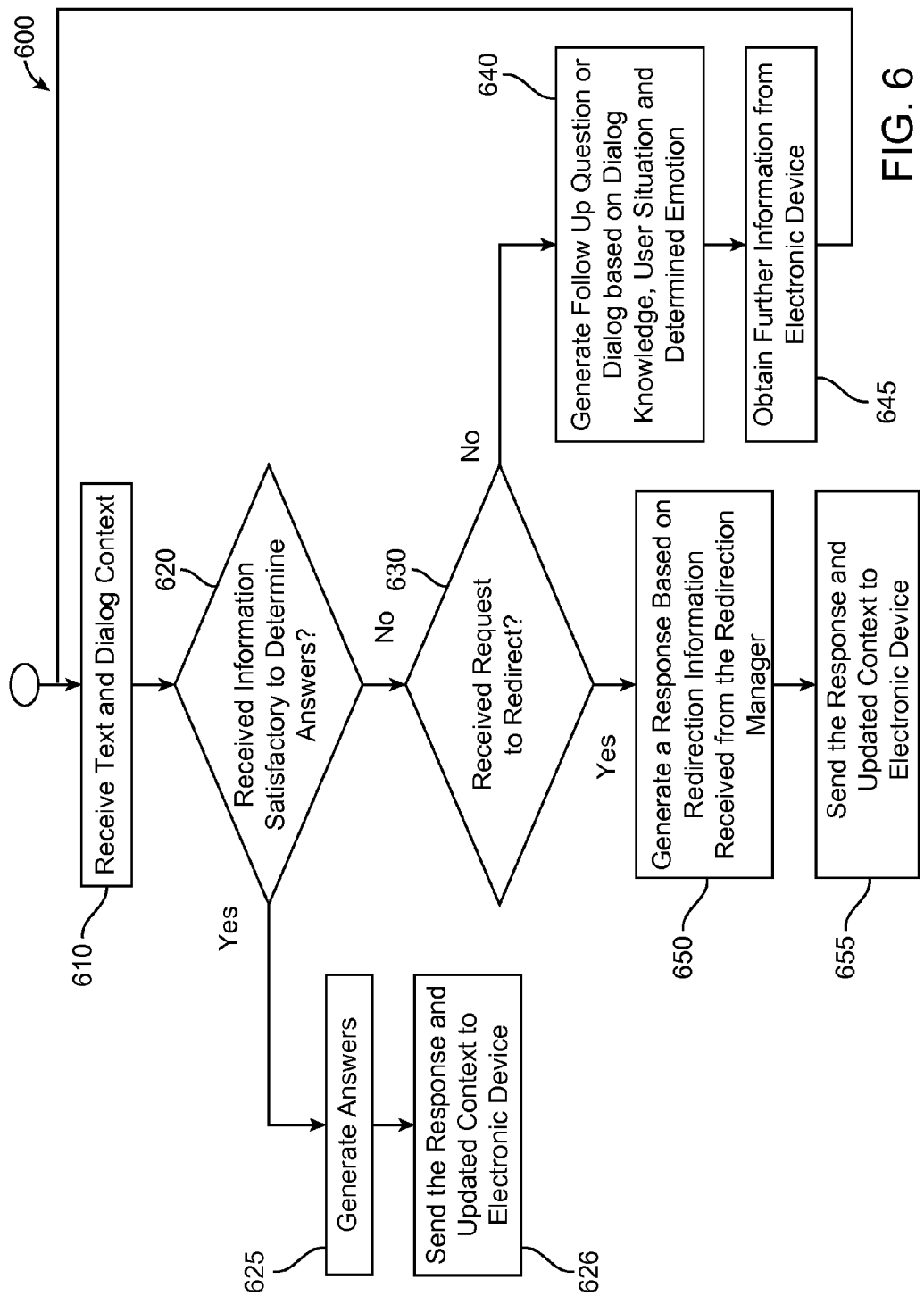
FIG. 6 shows an example process for online electronic device processing for digital customer service redirection, according to an embodiment.

FIG. 6 shows an example process 600 for online electronic device processing (e.g., using online system 140, FIGS. 3-4) for digital customer service redirection, according to an embodiment. In one embodiment, the process 600 starts and begins with block 610 that receives text and dialog content by the online system 140. In block 620 it is determined if the received information is satisfactory to determine an answer(s) to a customer inquiry. If the information is satisfactory, process 600 proceeds to block 625 where answers to the inquiry are generated. Process 600 then continues to block 626 where the response is sent to the customer's electronic device with updated context. If it is determined in block 620 that the information is not satisfactory to provide an answer to a customer's inquiry, process 600 continues to block 630.

In one embodiment, in block 630 it is determined if a request to redirect is received. If a redirect request (sent by the redirection manager 345, FIG. 3) is received, process 600 continues to block 650. In block 650, a response is generated based on redirection information received from the redirection manager (e.g., redirection manager 345). In block 655 the response and updated context are sent to the customer's electronic device. If it is determined that a redirect request has not been received, in block 640 a follow up question is generated or dialog is conducted based on dialog knowledge, user situation and determined emotion. In block 645 further information is obtained from the electronic device and process 600 proceeds to block 610.

In one embodiment, the dialog manager 335 portion of process 600 includes the following. Text input and dialog context are received from the on-device dialog processing (e.g., customer service redirection processing 132). The dialog manager 335 understands the customer question based on the user text input and dialog context. The dialog context and question understanding result are sent to the emotion detector 330 and situation detector 340. Customer emotion state is received from the emotion detector 330. User situation is received from the situation detector 340. It is determined if there is enough information for finding answers and generating queries based on the understanding. If there is enough information, the dialog manager 335 queries the customer service KB 350 to retrieve answers and generates a response based on the retrieved answers. Otherwise, if receiving a request to initiate a redirection from the redirection manager 345 with the redirection instruction and justification, forms a response based on the received information. Still otherwise, the dialog manager 335 generates a follow up question/dialog to obtain more information from the user based on dialog knowledge, user situation and user emotion. Once the response (answer or follow up question) is generated, the dialog manager 335 sends the response and updated dialog context back to the customer device.

In one embodiment, processing for the emotion detector portion of process 600 may include the following. Customer information is received from monitoring devices processing 310. Dialog context and question understanding results are received from the dialog manager 335. Customer emotion states are determined based on the user information and question understanding results. Identified user emotion state is sent to the redirection manager 345.

In one embodiment, the processing for the situation detector 340 processing of process 600 may include the following. Customer information is received from monitoring devices processing 310. Dialog context and question understanding results are received from the dialog manager 335. User situation is determined based on the customer information and question understanding results. The identified customer situation state is then sent to the redirection manager 345.

Figure 7:
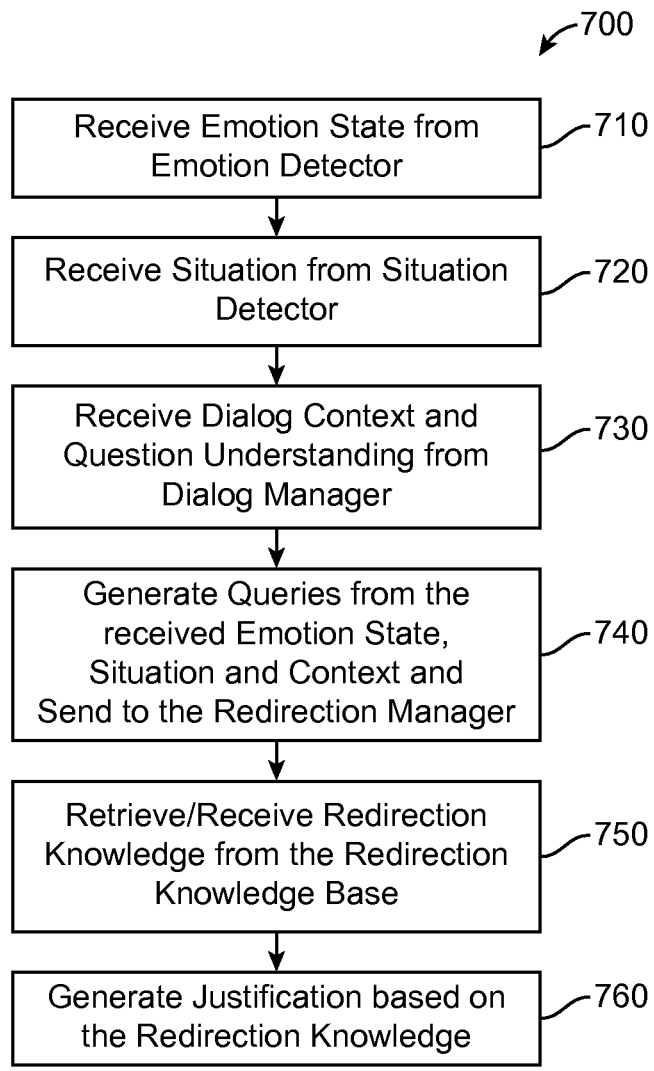
FIG. 7 shows an example process for redirection manager processing for digital customer service redirection, according to an embodiment.

FIG. 7 shows an example process 700 for redirection manager processing for digital customer service redirection, according to an embodiment. Block 710 includes receiving customer emotion state from the emotion detector 330. In block 720 customer situation is received from the situation detector 340. In block 730 dialog context and question understanding results are received from the dialog manager 335. It should be noted that blocks 710, 720 and 730 may be obtained or processed in any order, in parallel, etc.

In one embodiment, in block 740 queries are generated based on the emotion state, situation and context information and sent to the redirection manager 345. In block 750 redirection knowledge is retrieved/received from the redirection KB 360. An example of the redirection KB 360 may be a collection of redirection rules, consisting of conditions of redirection and redirection options under the condition. In one example, a reasoning engine may be used to compute the model of the rules based on the input information.

In one embodiment, in block 760 justification is generated based on the retrieved redirection knowledge and the redirection KB 360. In the case of a rule redirection KB, justification may be generated by tracking the triggered rules and use the meta information about each rule to generate provenance information based on the reasoning steps.

Figure 8:
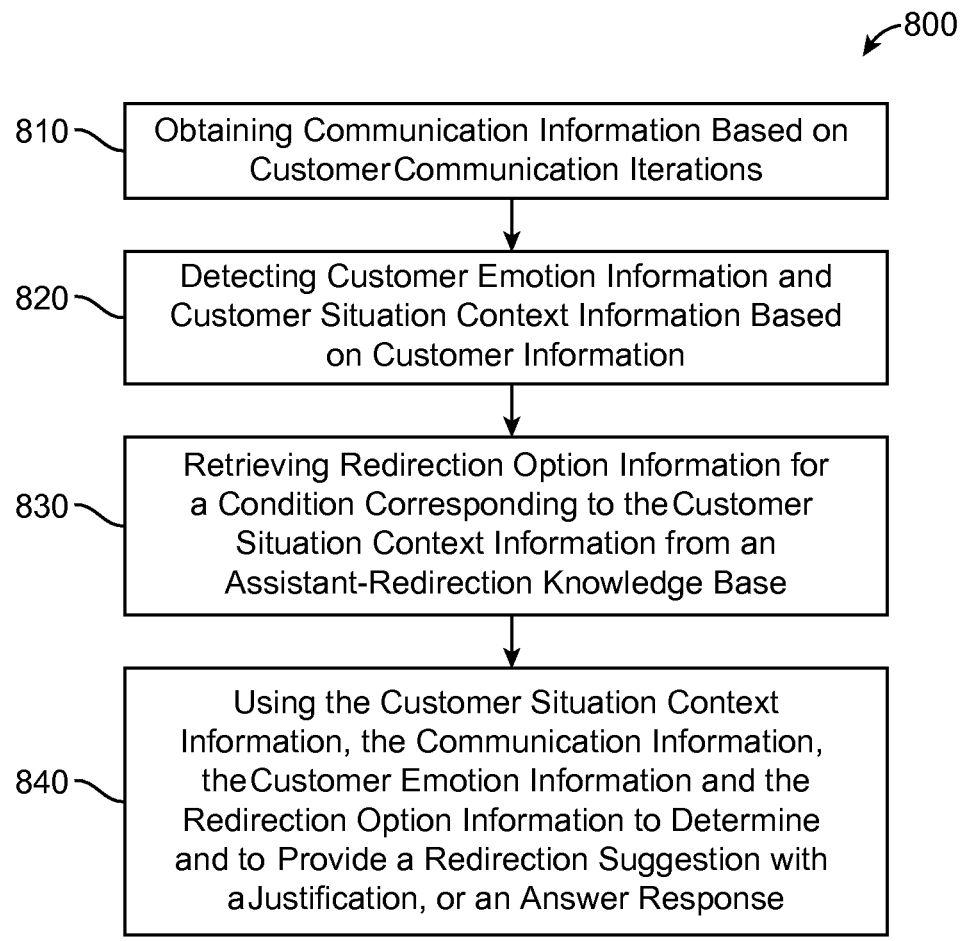
FIG. 8 shows a process for automatic processing for digital customer service redirection, according to one embodiment.

FIG. 8 shows a process 800 for automatic processing for digital customer service redirection, according to one embodiment. In one embodiment, block 810 includes obtaining communication information based on customer communication iterations. In block 820 customer emotion information and customer situation context information is detected based on customer information obtained from one or more devices. In block 830 redirection option information is retrieved for a condition corresponding to the customer situation context information from an assistant-redirection knowledge base (e.g., redirection KB 360). In one embodiment, in block 840 the customer situation context information, the communication information, the customer emotion information and the redirection option information are used to determine to provide a redirection suggestion with a justification, or an answer response.

In one embodiment, process 800 may include that a subsequent customer communication is analyzed to extract knowledge from at least one of: assistant-redirection options, assistant redirection rules and new justification. Process 800 may further include that the assistant-redirection KB is updated with the extracted knowledge.

In one embodiment, process 800 may further include that detecting customer emotion information and customer situation context includes obtaining at least one of customer information: generated by a customer, generated about the customer (e.g., data that are not generated by the user but can be useful for detecting emotion and situation, such as photographs, video, voice recordings, etc.) or generated by the customer and generated about the customer. In one embodiment, detecting customer situation context includes obtaining type of device accessing a digital assistant and current user activity.

In one embodiment, content of the customer information comprises at least one of: text, voice, sensor readings, image or video. The customer information includes at least one of: call logs, short range wireless devices in proximity of a customer device, cell tower identifications, application usage, customer device status, or a customer photo or a customer video.

In one embodiment, process 800 may further include generating at least one query to the assistant-redirection knowledge base using the customer situation context information, the communication information, the customer emotion information and question understanding. In one embodiment, the assistant-redirection knowledge base includes a collection of redirection rules comprising conditions of redirection and redirection options based on conditions.

In one embodiment, process 800 may further include modeling and classifying utterances in the communication information to a set of tags that indicate functionality and intention of each utterance, and performing factual knowledge extraction using the set of tags to label customer service concepts mentioned in the communication information. In one embodiment, process 800 may include performing dialog workflow mining based on the labeled customer service concepts using machine learning to partition and classify the dialog information, and mapping identified dialog to existing models to identify transition of states in a given dialog. Process 800 may further include analyzing customer emotion information in livechat dialog text, and determining redirection rules from the livechat dialog text using rule learning based on dialog workflow, dialog state and customer emotion information in a current state.

Figure 9:
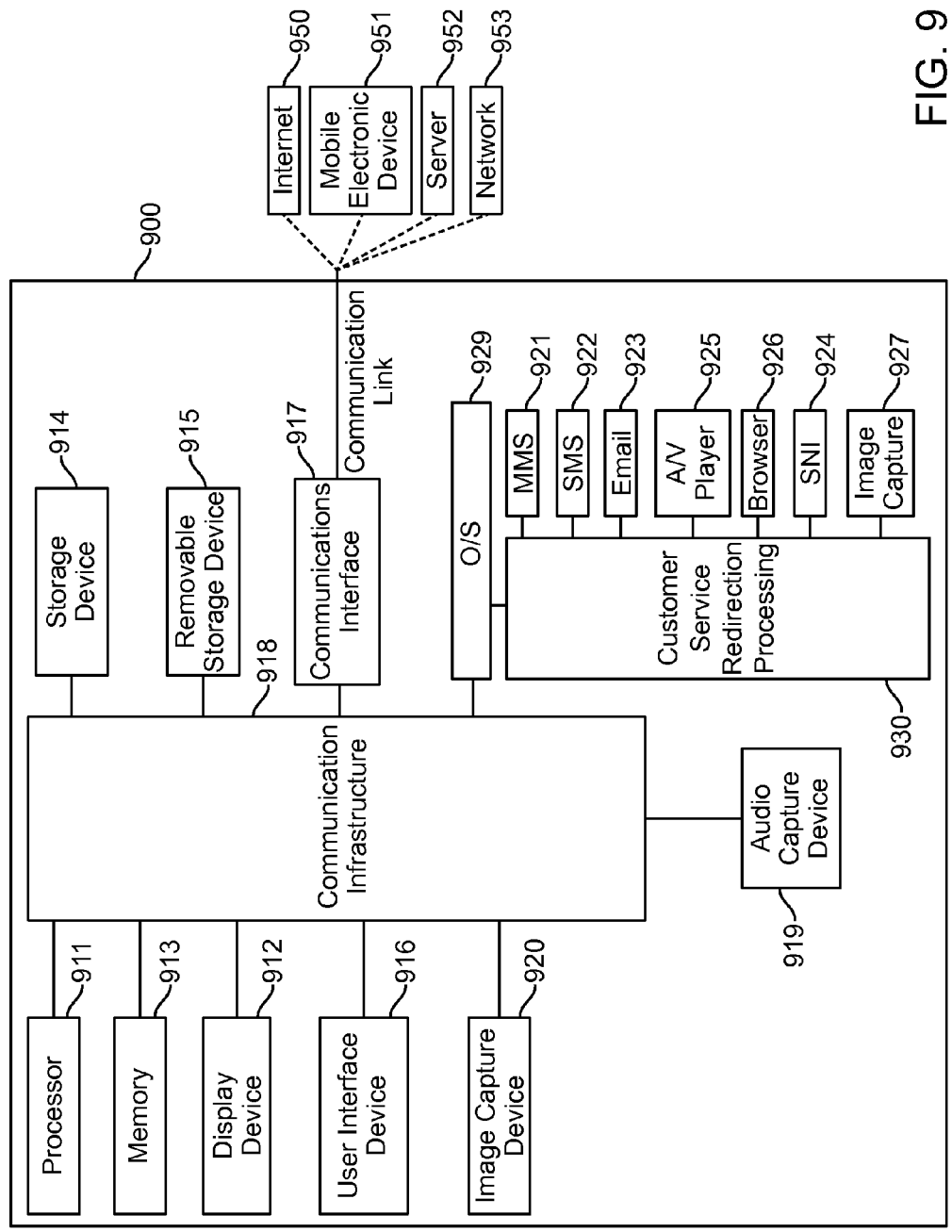
FIG. 9 is a high-level block diagram showing an information processing system comprising a computing system implementing one or more embodiments.

FIG. 9 is a high-level block diagram showing an information processing system comprising a computing system 900 implementing one or more embodiments. The system 900 includes one or more processors 911 (e.g., ASIC, CPU, etc.), and may further include an electronic display device 912 (for displaying graphics, text, and other data), a main memory 913 (e.g., random access memory (RAM), cache devices, etc.), storage device 914 (e.g., hard disk drive), removable storage device 915 (e.g., removable storage drive, removable memory, a magnetic tape drive, optical disk drive, computer-readable medium having stored therein computer software and/or data), user interface device 916 (e.g., keyboard, touch screen, keypad, pointing device), and a communication interface 917 (e.g., modem, wireless transceiver (such as Wi-Fi, Cellular), a network interface (such as an Ethernet card), a communications port, or a PCMCIA slot and card).

The communication interface 917 allows software and data to be transferred between the computer system and external devices through the Internet 950, mobile electronic device 951, a server 952, a network 953, etc. The system 900 further includes a communications infrastructure 918 (e.g., a communications bus, cross bar, or network) to which the aforementioned devices/interfaces 911 through 917 are connected.

The information transferred via communications interface 917 may be in the form of signals such as electronic, electromagnetic, optical, or other signals capable of being received by communications interface 917, via a communication link that carries signals and may be implemented using wire or cable, fiber optics, a phone line, a cellular phone link, an radio frequency (RF) link, and/or other communication channels.

In one implementation of one or more embodiments in a wireless device (e.g., a mobile phone, smartphone, tablet, mobile computing device, wearable device, etc.), the system 900 further includes an image capture device 920, such as a camera 128 (FIG. 2), and an audio capture device 919, such as a microphone 122 (FIG. 2). The system 900 may further include application interfaces as MMS interface 921, SMS interface 922, email interface 923, social network interface (SNI) 924, audio/video (AV) player 925, web browser 926, image capture interface 927, etc.

In one embodiment, the system 900 includes customer service redirection processing interface 930 that may implement system 300 for digital customer service redirection processing similar as described above, and components in block diagram 200 (FIG. 2). In one embodiment, the customer service redirection processing interface 930 may implement the customer service redirection processing flow diagram 400 (FIG. 4). In one embodiment, the customer service redirection processing interface (e.g., a processor, interface, etc.) 930 along with an operating system 929 may be implemented as executable code residing in a memory of the system 900. In another embodiment, the customer service redirection processing interface 930 may be provided in hardware, firmware, etc.

As is known to those skilled in the art, the aforementioned example architectures described above, according to said architectures, can be implemented in many ways, such as program instructions for execution by a processor, as software packages, microcode, as computer program product on computer readable media, as analog/logic circuits, as application specific integrated circuits, as firmware, as consumer electronic devices, AV devices, wireless/wired transmitters, wireless/wired receivers, networks, multi-media devices, as hardware interfaces, etc. Further, embodiments of said Architecture can take the form of an entirely hardware embodiment, an embodiment containing both hardware and software elements, etc.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software packages or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   obtaining communication information based on one or more customer communication iterations between a customer service channel and an electronic device in relation to a customer inquiry from the electronic device, wherein the electronic device comprises at least one sensor;
   detecting customer emotion information and customer situation context information based on customer information obtained from the electronic device, wherein a portion of the customer information is recorded by the at least one sensor of the electronic device;
   retrieving redirection option information comprising one or more redirection options available for a condition corresponding to the customer situation context information from an assistant-redirection knowledge base; and
   determining whether a redirection from the customer service channel to a different customer service channel is necessary based on the customer situation context information, the communication information, the customer emotion information, and the redirection option information;
   wherein at least one of the one or more redirection options is provided as a redirection suggestion to the electronic device with a justification for the redirection in response to determining the redirection is necessary; and
   wherein an answer response for the customer inquiry is provided to the electronic device in response to determining the redirection is unnecessary.

2. The method of claim 1, wherein detecting customer emotion information and customer situation context information comprises obtaining at least one of content: generated by a customer utilizing the electronic device, generated about the customer, or generated by the customer and generated about the customer.

3. The method of claim 1, wherein:
   the customer service channel comprises a digital customer service agent;
   the different customer service channel comprises one of: a human agent, a service center, a local store, or a third-party support; and
   detecting customer emotion information and customer situation context information comprises obtaining a type of the electronic device and current user activity of a customer utilizing the electronic device.

4. The method of claim 1, wherein the customer information comprises at least one of: text, voice, one or more sensor readings recorded by the at least one sensor of the electronic device, image, or video.

5. The method of claim 1, wherein the customer information comprises at least one of: one or more call logs, information associated with one or more short range wireless devices within proximity of the electronic device, one or more cell tower identifications, application usage, status of the electronic device, a customer photo, or a customer video.

6. The method of claim 1, further comprising:
   analyzing dialog information indicative of back and forth dialog between the customer service channel and the electronic device to extract knowledge relating to at least one of: the one or more additional redirection options, one or more redirection rules, and one or more additional justifications;
   updating the assistant-redirection knowledge base with the extracted knowledge; and
   generating at least one query to the assistant-redirection knowledge base using the customer situation context information, the dialog information, the customer emotion information, and question understanding.

7. The method of claim 1, wherein the assistant-redirection knowledge base includes a collection of one or more redirection rules comprising one or more conditions of redirection and one or more redirection options for the one or more conditions.

8. The method of claim 1, further comprising:
   modeling and classifying one or more utterances in the communication information to a one or more tags that indicate functionality and intention of the one or more utterances; and
   performing factual knowledge extraction using the one or more tags to label one or more customer service concepts mentioned in the communication information.

9. The method of claim 8, further comprising:
performing dialog workflow mining based on the one or more labeled customer service concepts using machine learning to partition and classify dialog information indicative of back and forth dialog between the customer service channel and the electronic device, and mapping the classified dialog information to one or more existing models to identify one or more transitions of state in the dialog.

10. The method of claim 9, wherein detecting customer emotion information and customer situation context information comprises:
analyzing a current state of customer emotion based on livechat dialog text for a livechat dialog between the customer service channel and a customer utilizing the electronic device; and
determining one or more redirection rules from the livechat dialog text using rule learning based on dialog workflow mining of the livechat dialog, a current state of the livechat dialog, and the current state of customer emotion.

11. An apparatus comprising:
at least one processor; and
a non-transitory processor-readable memory device storing instructions that when executed by the at least one processor causes the at least one processor to perform operations including:
obtaining communication information based on one or more customer communication iterations between a customer service channel and an electronic device in relation to a customer inquiry from the electronic device, wherein the electronic device comprises at least one sensor;
detecting customer emotion information and customer situation context information based on customer information obtained from the electronic device, wherein a portion of the customer information is recorded by the at least one sensor of the electronic device;
retrieving redirection option information comprising one or more redirection options available for a condition corresponding to the customer situation context information from an assistant-redirection knowledge base; and
determining whether a redirection from the customer service channel to a different customer service channel is necessary based on the customer situation context information, the communication information, the customer emotion information, and the redirection option information;
wherein at least one of the one or more redirection options is provided as a redirection suggestion to the electronic device with a justification for the redirection in response to determining the redirection is necessary; and
wherein an answer response for the customer inquiry is provided to the electronic device in response to determining the redirection is unnecessary.

12. The apparatus of claim 11, wherein detecting customer emotion information and customer situation context information comprises obtaining at least one of content: generated by a customer utilizing the electronic device, generated about the customer, or generated by the customer and generated about the customer.

13. The apparatus of claim 11, wherein:
the customer service channel comprises a digital customer service agent;
the different customer service channel comprises one of: a human agent, a service center, a local store, or a third-party support; and
detecting customer emotion information and customer situation context information comprises obtaining a type of the electronic device and current user activity of a customer utilizing the electronic device.

14. The apparatus of claim 11, wherein the customer information comprises at least one of: text, voice, one or more sensor readings recorded by the at least one sensor of the electronic device, image, or video.

15. The apparatus of claim 11, wherein the customer information comprises at least one of: one or more call logs, information associated with one or more short range wireless devices within proximity of the electronic device, one or more cell tower identifications, application usage, status of the electronic device, a customer photo, or a customer video.

16. The apparatus of claim 11, wherein the operations further comprise:
analyzing dialog information indicative of back and forth dialog between the customer service channel and the electronic device to extract knowledge relating to at least one of: one or more additional redirection options, one or more redirection rules, and one or more additional justifications;
updating the assistant-redirection knowledge base with the extracted knowledge; and
generating at least one query to the assistant-redirection knowledge base using the customer situation context information, the communication information, the customer emotion information, and question understanding.

17. The apparatus of claim 11, wherein the assistant-redirection knowledge base includes a collection of one or more redirection rules comprising one or more conditions of redirection and one or more redirection options for the one or more conditions.

18. The apparatus of claim 11, wherein the operations further comprise:
modeling and classifying one or more utterances in the communication information to a one or more tags that indicate functionality and intention of the one or more utterances; and
performing factual knowledge extraction using the one or more tags to label one or more customer service concepts mentioned in the communication information.

19. The apparatus of claim 18, wherein the operations further comprise:
performing dialog workflow mining based on the one or more labeled customer service concepts using machine learning to partition and classify the dialog information, and mapping the classified dialog information to one or more existing models to identify one or more transitions of state in the dialog.

20. The apparatus of claim 19, wherein the operations further comprise:
analyzing a current state of customer emotion based on livechat dialog text for a livechat dialog between the customer service channel and a customer utilizing the electronic device; and
determining one or more redirection rules from the livechat dialog text using rule learning based on dialog workflow mining of the livechat dialog, a current state of the livechat dialog, and the current state of customer emotion.

21. A non-transitory processor-readable medium that includes a program that when executed by a processor performs a method comprising:
- obtaining communication information based on one or more customer communication iterations between a customer service channel and an electronic device in relation to a customer inquiry from the electronic device, wherein the electronic device comprises at least one sensor;
- detecting customer emotion information and customer situation context information based on customer information obtained from the electronic device, wherein a portion of the customer information is recorded by the at least one sensor of the electronic device;
- retrieving redirection option information comprising one or more redirection options available for a condition corresponding to the customer situation context information from an assistant-redirection knowledge base; and
- determining whether a redirection from the customer service channel to a different customer service channel is necessary based on the customer situation context information, the communication information, the customer emotion information, and the redirection option information;
- wherein at least one of the one or more redirection options is provided as a redirection suggestion to the electronic device with a justification for the redirection in response to determining the redirection is necessary; and
- wherein an answer response for the customer inquiry is provided to the electronic device in response to determining the redirection is unnecessary.

22. The non-transitory processor-readable medium of claim 21, wherein detecting customer emotion information and customer situation context information comprises:
- obtaining at least one of content: generated by a customer utilizing the electronic device, generated about the customer, or generated by the customer and generated about the customer; and
- obtaining a type of the electronic device and current user activity of a customer utilizing the electronic device.

23. The non-transitory processor-readable medium of claim 21, wherein the customer information comprises at least one of: text, voice, one or more sensor readings recorded by the at least one sensor of the electronic device, image, or video.

24. The non-transitory processor-readable medium of claim 21, further comprising:
- analyzing dialog information indicative of back and forth dialog between the customer service channel and the electronic device to extract knowledge relating to at least one of: one or more additional redirection options, one or more redirection rules, and one or more additional justifications; and
- updating the assistant-redirection knowledge base with the extracted knowledge;
- wherein the customer information comprises at least one of: one or more call logs, information associated with one or more short range wireless devices within proximity of the electronic device, one or more cell tower identifications, application usage, status of the electronic device, a customer photo, or a customer video.

25. The non-transitory processor-readable medium of claim 24, further comprising:
- generating at least one query to the assistant-redirection knowledge base using the customer situation context information, the dialog information, the customer emotion information, and question understanding.

26. The non-transitory processor-readable medium of claim 21, wherein the assistant-redirection knowledge base includes a collection of one or more redirection rules comprising one or more conditions of redirection and one or more redirection options for the one or more conditions.

27. The non-transitory processor-readable medium of claim 21, further comprising:
- modeling and classifying one or more utterances in the communication information to a one or more tags that indicate functionality and intention of the one or more utterances; and
- performing factual knowledge extraction using the one or more tags to label one or more customer service concepts mentioned in the communication information.

28. The non-transitory processor-readable medium of claim 27, further comprising:
- performing dialog workflow mining based on the one or more labeled customer service concepts using machine learning to partition and classify dialog information indicative of back and forth dialog between the customer service channel and the electronic device, and mapping the classified dialog information to one or more existing models to identify one or more transitions of state in the dialog.

29. The non-transitory processor-readable medium of claim 28, wherein detecting customer emotion information and customer situation context information comprises:
- analyzing a current state of customer emotion based on livechat dialog text for a livechat dialog between the customer service channel and a customer utilizing the electronic device; and
- determining one or more redirection rules from the livechat dialog text using rule learning based on dialog workflow mining of the livechat dialog, a current state of the livechat dialog, and the current state of customer emotion.

* * * * *